US009181048B1

(12) United States Patent
Rash

(10) Patent No.: US 9,181,048 B1
(45) Date of Patent: Nov. 10, 2015

(54) PORTABLE STORAGE CONTAINER SYSTEM

(71) Applicant: The Rosemyr Corporation, Henderson, NC (US)

(72) Inventor: Mark Rash, Forest, VA (US)

(73) Assignee: The Rosemyr Corporation, Henderson, NC (US)

(*) Notice: Subject to any disclaimer, the term of this patent is extended or adjusted under 35 U.S.C. 154(b) by 255 days.

(21) Appl. No.: 13/729,200

(22) Filed: Dec. 28, 2012

Related U.S. Application Data

(60) Provisional application No. 61/581,763, filed on Dec. 30, 2011.

(51) Int. Cl.
*B65G 67/04* (2006.01)
*B66F 9/14* (2006.01)
*B66F 9/22* (2006.01)
*B66F 9/16* (2006.01)

(52) U.S. Cl.
CPC . *B65G 67/04* (2013.01); *B66F 9/14* (2013.01); *B66F 9/16* (2013.01); *B66F 9/22* (2013.01)

(58) Field of Classification Search
CPC .............. B66G 9/14; B66G 9/16; B66G 9/22; B66G 9/00–9/24
USPC ......................... 414/399, 539–541, 396, 458; 280/43.23; 410/44, 46, 45, 53
See application file for complete search history.

(56) References Cited

U.S. PATENT DOCUMENTS 3,472,408 A * 10/1969 Hendricks et al. ............ 414/632
4,177,001 A * 12/1979 Blackwood ................... 414/628
5,829,947 A * 11/1998 Litten ........................... 414/537
7,704,032 B2 * 4/2010 Rash et al. .................... 414/391
2003/0091417 A1 * 5/2003 Swann .......................... 414/458
2005/0019144 A1 * 1/2005 Neria ............................ 414/607
2009/0257854 A1 * 10/2009 Wright et al. ................ 414/499
2010/0080682 A1 * 4/2010 Keeven et al. ................ 414/800
2010/0183412 A1 * 7/2010 Borntrager et al. ........... 414/541
2011/0037963 A1 * 2/2011 Weiss et al. .................... 356/3.1
2011/0270785 A1 * 11/2011 Kern et al. .................... 705/500

FOREIGN PATENT DOCUMENTS

DE 19927418 A1 * 1/2001

* cited by examiner

*Primary Examiner* — Saul Rodriguez
*Assistant Examiner* — Ashley Romano
(74) *Attorney, Agent, or Firm* — Charles S. Sara Esq.; DeWitt Ross & Stevens SC

(57) ABSTRACT

A mobile transport and storage system, comprising at least a storage container and a hand-controlled lifting wheel assembly is described. The storage container includes a substantially rectangular base and frame constructed with a rear wall, opposing side walls, a front wall, a roof and a floor having an underside, wherein one of the rear wall, front wall or opposing side walls include an opening, and two slides (longsills) defined in, or disposed on, the underside of the floor, wherein the two slides are substantially parallel to each other, and wherein the slides extend lengthwise in a direction extending from the front wall to the rear wall. The lifting wheel assembly includes a handle connected to a rectangular shaped base unit which serves as the body of the assembly. Included on the handle is a switch for activating the raising and lowering mechanism of the assembly unit, and a warning or caution beacon with an activation switch. The base includes an axle and wheel assembly and two parallel-disposed lift fork assemblies. By pressing the raise/lower switch button, a motor and pump are activated which extends lift cylinders to elevate the lift forks. The system further includes a power hand truck with an outrigger assembly and a flatbed trailer.

14 Claims, 13 Drawing Sheets

PORTABLE STORAGE CONTAINER SYSTEM

FIELD OF THE INVENTION

This invention is directed to a self-contained mobile storage container in general and, specifically to a portable storage system comprising a hydraulic lifting wheel assembly and a power truck with an outrigger assembly which combine to assist in the transportation and storage of a portable storage container by means of a specially designed flatbed trailer.

BACKGROUND

The moving and storage industry often serves consumers who need to store large amounts of material for varying lengths of time. This situation arises when families are changing jobs and moving to different cities, remodeling their current home, and more. Customers who need off-site storage are often in the throes of a stressful situation made even more so by the inconvenience, expense and inefficiency of traditional moving and storage options.

Traditionally, moving and storage options consist of a warehouse divided into multiple units which can be rented for expensive fees. To use traditional storage units, the customer must either pay someone to load the material requiring storage or do so themselves and bring it to the storage facility. The material is then unloaded and packed away in the storage unit. When storage is no longer needed, the material must be removed from the storage facility, reloaded into a truck, transported back to the desired location and finally unloaded yet again. The material to be stored is handled a total of four times, resulting in great inefficiency and rising costs.

Another inconvenience with traditional mini-storage and moving options is the location of the storage units. Traditional moving and storage units are often located in out of the way neighborhoods, as space for storage units is rarely found in downtown areas. Space for long-term storage is hard to find in any situation, but especially in large metropolitan areas where even space for parking is at a premium. In the rare instance storage space is conveniently located, it is often exorbitantly expensive.

It is often helpful to provide a portable storage container unit at the user's location and then be able to easily transport the container unit to another location such as a storage facility or another location designated by the user. While systems like this are available in the industry, none provide the combination of allowing the container unit to be easily move within a storage yard, onto a transportation vehicle (such as a flatbed trailer), and to the user's location.

SUMMARY OF THE INVENTION

The present invention is directed to a mobile transport and storage system, comprising at least a storage container and a hand-controlled lifting wheel assembly. The storage container includes a substantially rectangular base and frame constructed with a rear wall, opposing side walls, a front wall, a roof and a floor having an underside, wherein one of the rear wall, front wall or opposing side walls include an opening, and two slides (longsills) defined in, or disposed on, the underside of the floor, wherein the two slides are substantially parallel to each other, and wherein the slides extend lengthwise in a direction extending from the front wall to the rear wall.

The hydraulic lifting wheel assembly includes a handle connected to a rectangular shaped base unit which serves as the body of the assembly. Included on the handle is a switch for activating the raising and lowering mechanism of the assembly unit and a warning or caution beacon with an activation switch. The base includes an axle and wheel assembly and two parallel-disposed lift fork assemblies. By pressing the raise/lower switch button, a motor and pump are activated which extends lift cylinders to elevate the lift forks. The purpose of the assembly is to create a device which can be used in the portable storage industry to aid in the movement of portable storage units. The assembly easily attaches to the portable storage unit by attaching to the longsills or steel tubing connected on the bottom of the storage unit. Once the assembly is attached to the unit, it can be activated to raise the portable storage unit off the ground allowing the unit to be moved easily by rolling the assembly.

The system further includes a mobile powered hand truck (also referred to as a "mule") with a unique outrigger assembly comprising a modified lifting arm assembly that includes specialized lifting forks. The mule consists of a gasoline motor that drives hydraulic pumps that serve several functions from driving the power wheels to working the hydraulic cylinders that raise, lower and tilt several components on the equipment.

The system further includes a flatbed trailer supported by wheels and adapted to be removably attached to a truck. The flatbed trailer includes a platform defined there on, wherein the platform remains substantially horizontal with the ground, at least one and preferably two or more lock down units, i.e., straps, to releasably secure the storage container unit to the platform of the flatbed trailer. The trailer also contains a specially designed rack mounted on the front of the trailer. This rack is made to receive the tires and wheels mounted to the hydraulic lifting wheel assembly. The trailer also has a winch mounted on the front and a hydraulic dovetail ramp located on the rear.

In combination, the present invention includes a system for transporting a portable storage container unit, wherein the storage container unit includes floor comprising parallel disposed longsills and wherein the longsills include open ends. The system includes a lifting wheel assembly comprising a base unit comprising a wheel assembly including an axle connecting a pair of tire wheel assemblies and a hydraulic pump; and a lift fork assembly pivotally attached to the axle via axle-fork arms and including a hydraulic cylinder attached between the hydraulic pump and a pair of parallel-disposed lifting forks such that extension of the cylinders causes the pair of lifting forks to move upwardly, downwardly, outwardly and inwardly, wherein each of the pair of lifting forks includes fork tynes. The system further includes a mobile powered hand truck for moving at least one end of the storage container unit, the mobile powered hand truck including a powered chassis, the hand truck comprising a lifting arm assembly including a pair lift forks having fork tynes and an outrigger assembly attached to the lifting arm assembly. The outrigger assembly includes a central support structure, a pair of extension arms each having a first proximal end and a second distal end, wherein the first proximal ends of the extension arms are hingedly attached to the support mast, means to raise and lower the extension arms, locking means to secure the extension arms in raised position, locking means to secure the extension arms in lowered position, a wheeled assembly rotatably attached to the distal ends of each of the pair of extension arms. The system further includes a flatbed trailer for transporting a storage container system, comprising a hitch for securing the trailer to a vehicle, a bed having a first front end and a second back end supported by a series of wheels, a backboard at the first front end and positioned between the bed and the hitch, a rotating ramp at the back end of the trailer, wherein the ramp has a first proximal end rotatably attached to the back end of the trailer and a second distal end for placement at a ground surface for loading the storage container system; and means to secure the storage container system to the trailer.

Advantageously, the assembly of the present invention greatly reduces time and physical labor needed in the movement of portable storage units while also increasing the safety of the employee.

The assembly was created specifically for simplifying the movement of portable storage units. However, it is entirely within the scope of the present invention to be able to modify the assembly to work with other portable storage systems on the market today.

The assembly easily attaches to the portable storage unit within seconds by attaching to the long sills or steel tubing located on the bottom of the portable storage unit. Once the assembly is attached to the portable storage unit, it can be activated to raise one end of the portable storage unit off the ground allowing the storage unit to be moved easily by driving the assembly once the power unit is attached to the opposite end. To lift the storage unit, a switch is activated and the unit can be lifted off the ground or from its lowered position.

The system of the present invention is different in this respect where the lifting wheel assembly is much lighter and can be rolled around by hand to attach to the storage container unit. Once the storage container unit is lifted off the ground by the hydraulic lifting wheel device and power unit, it can be driven short distances to relocated if need be. However if the storage container unit is to be moved a long distance, it is placed or rolled onto a specially designed trailer that allows for the longer distance move if need be. The lifting wheel assembly of present invention is specific in the way it attaches to the storage container unit. Once it is attached to the storage container unit, it also specific to the way it loads and attaches to the flatbed trailer for transportation.

The objects and advantages of the invention will appear more fully from the following detailed description of the preferred embodiment of the invention made in conjunction with the accompanying drawings.

BRIEF DESCRIPTION OF THE DRAWINGS AND ATTACHMENTS

FIG. 1 is a side plan view of the portable storage container unit 12 of the present invention, which includes the hydraulic lifting wheel assembly 16 and the power hand truck 18 with outrigger assembly 124.

Figure 3:
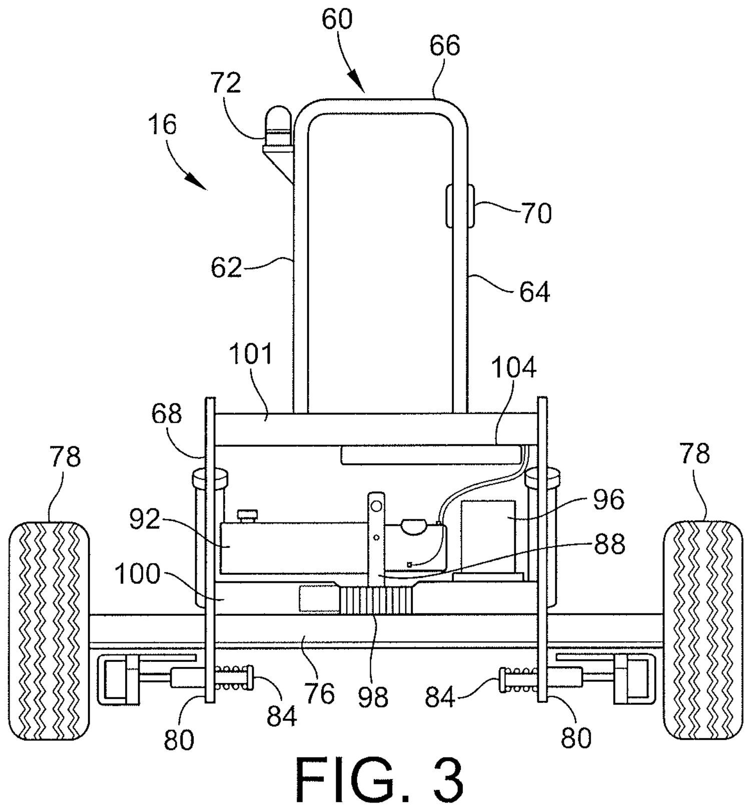
FIG. 3 is a front plan view of the hydraulic lifting wheel assembly 16 of the present invention.
Figure 6:
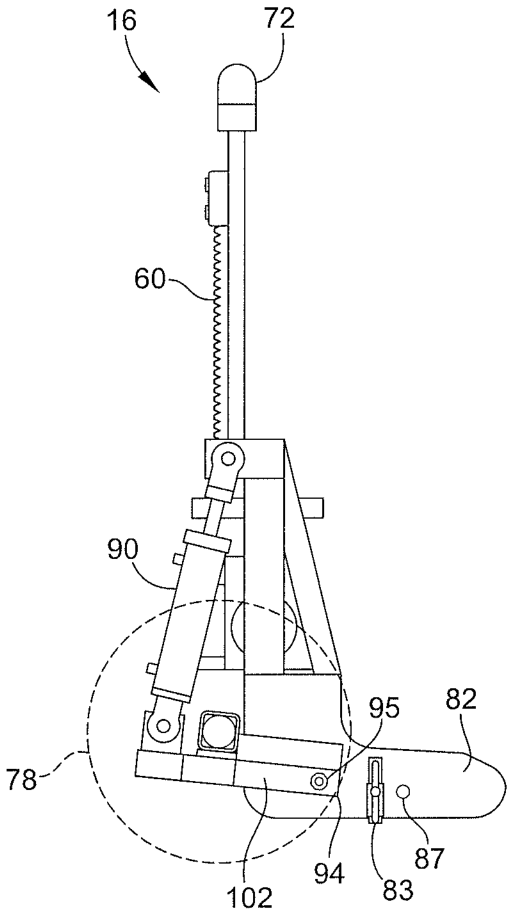

FIG. 6 is a side plan view of the hydraulic lifting wheel 16 assembly of FIG. 3 illustrating the lift fork tynes 82 in lowered position with the hydraulic lift cylinders 90 collapsed.

Figure 7:
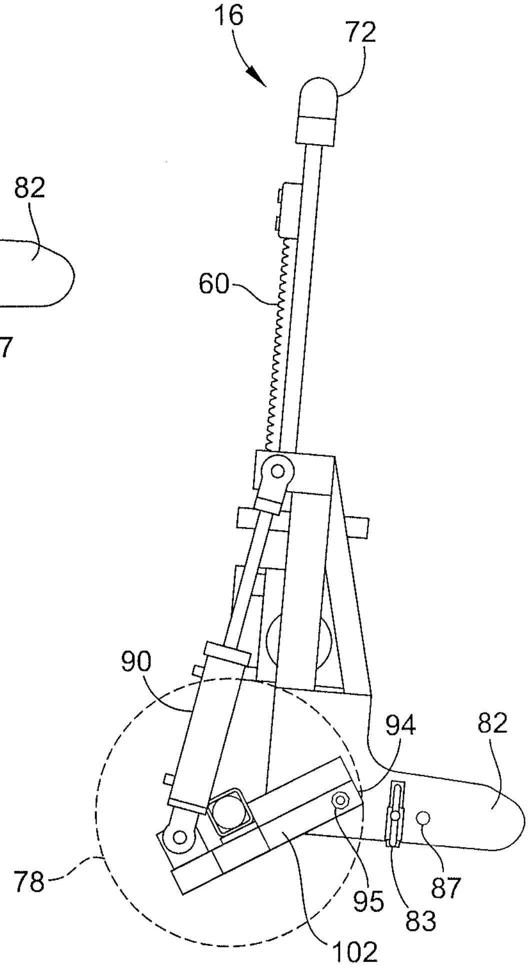

FIG. 7 is a side plan view of the hydraulic lifting wheel assembly 16 of FIG. 3 illustrating the raised lift fork tynes 82 with the hydraulic lift cylinders 90 fully extended.

Figure 8:
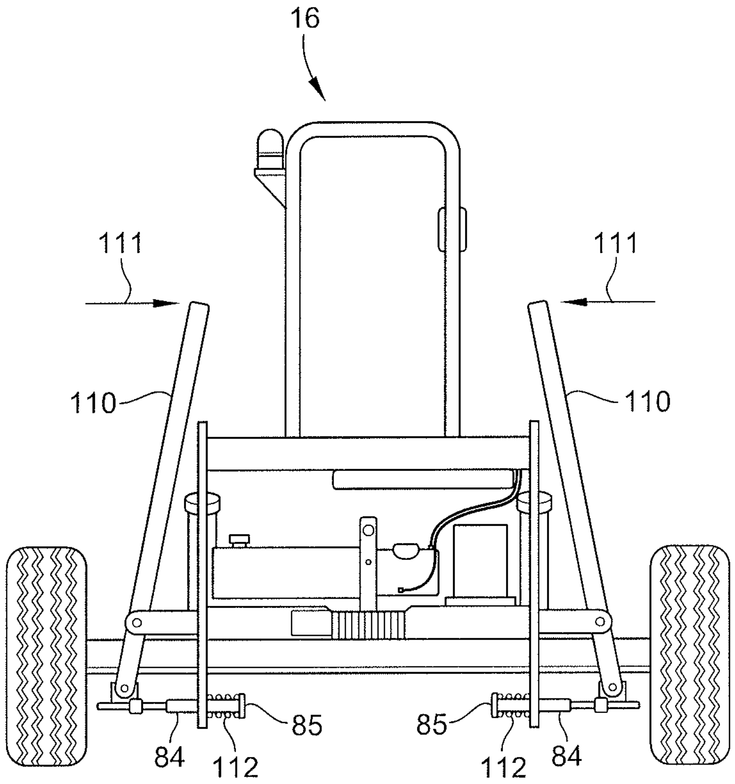

FIG. 8 is front plan view of an alternative embodiment of the hydraulic lifting wheel assembly 16 illustrating latch handles 110 connected to the release and locking pins 85.

Figure 9:
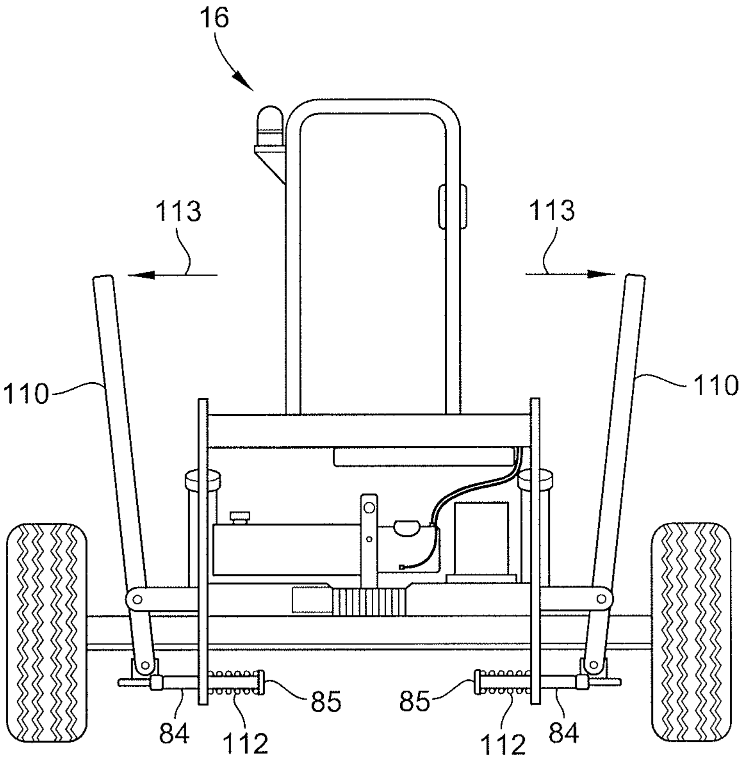

FIG. 9 is a front plan view of the hydraulic lifting wheel assembly 16 of FIG. 8 illustrating the assembly 16 in "latched" position with the latch handles 110 pressed outwardly.

Figure 10:
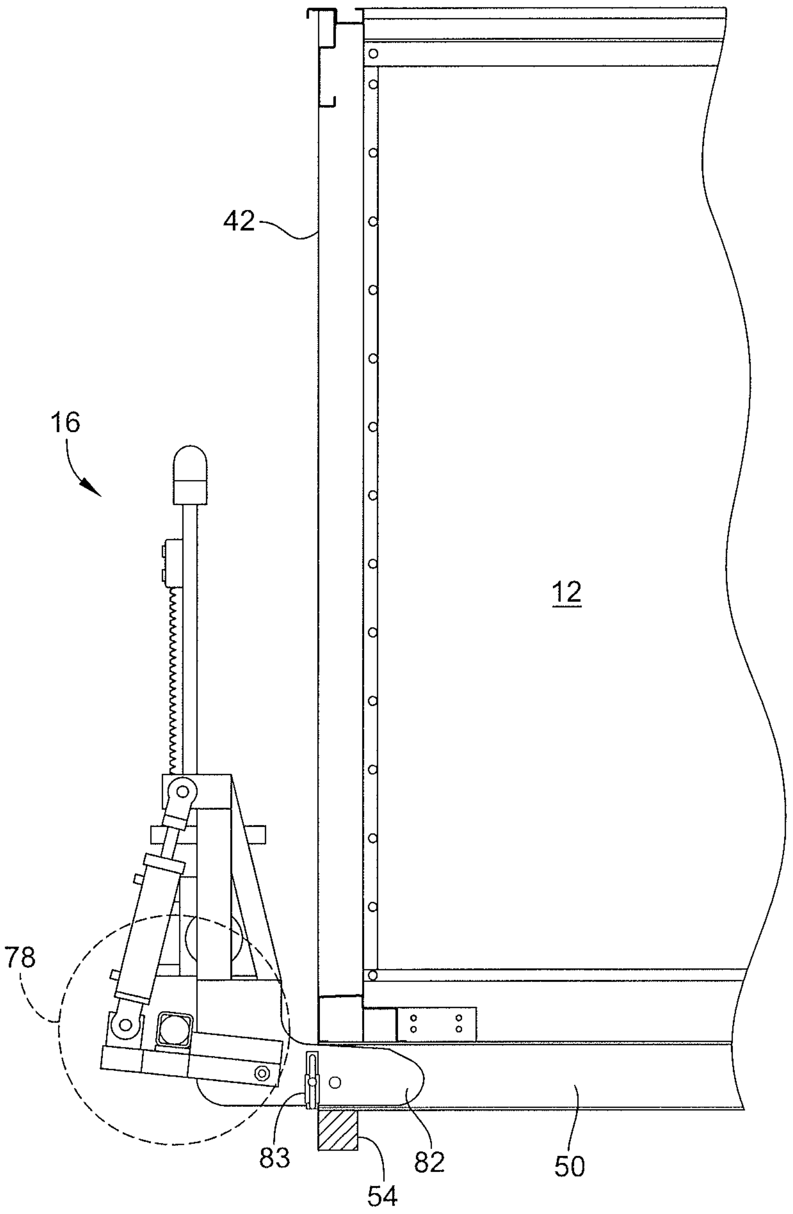

FIG. 10 is a partial side plan view illustrating the lifting wheel assembly 16 connected to the longsills 50 at the front wall 42 of the storage container unit 12.

Figure 11:
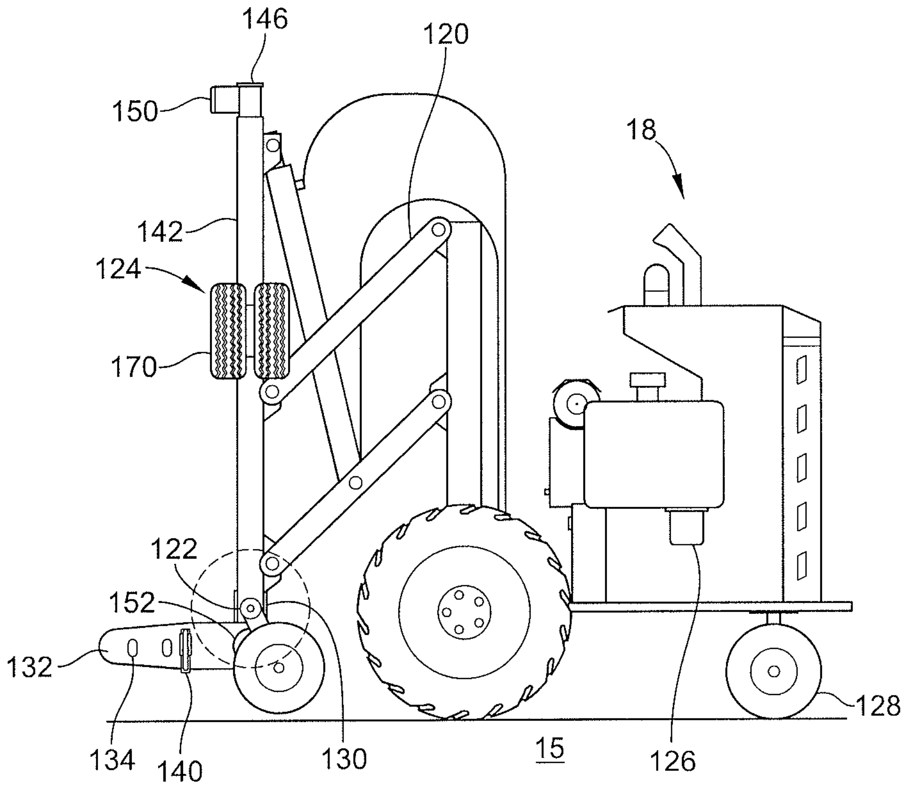

FIG. 11 is a side plan view of the power hand truck 18 with the outrigger assembly 124 included.

Figure 12:
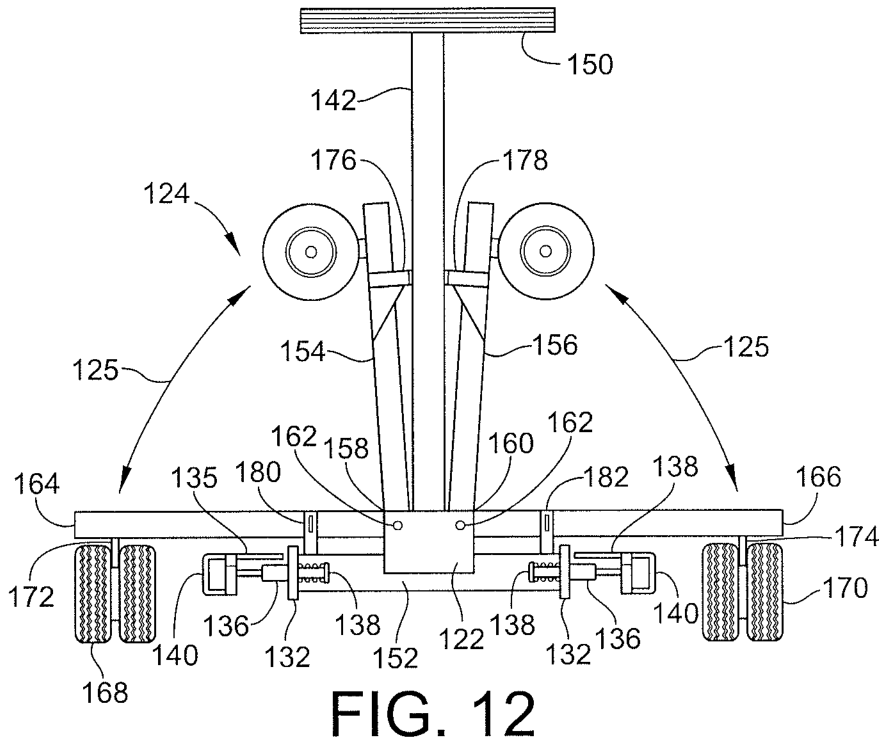

FIG. 12 is a front plan view of the power hand truck 18 with the outrigger assembly 124 included.

Figure 13:
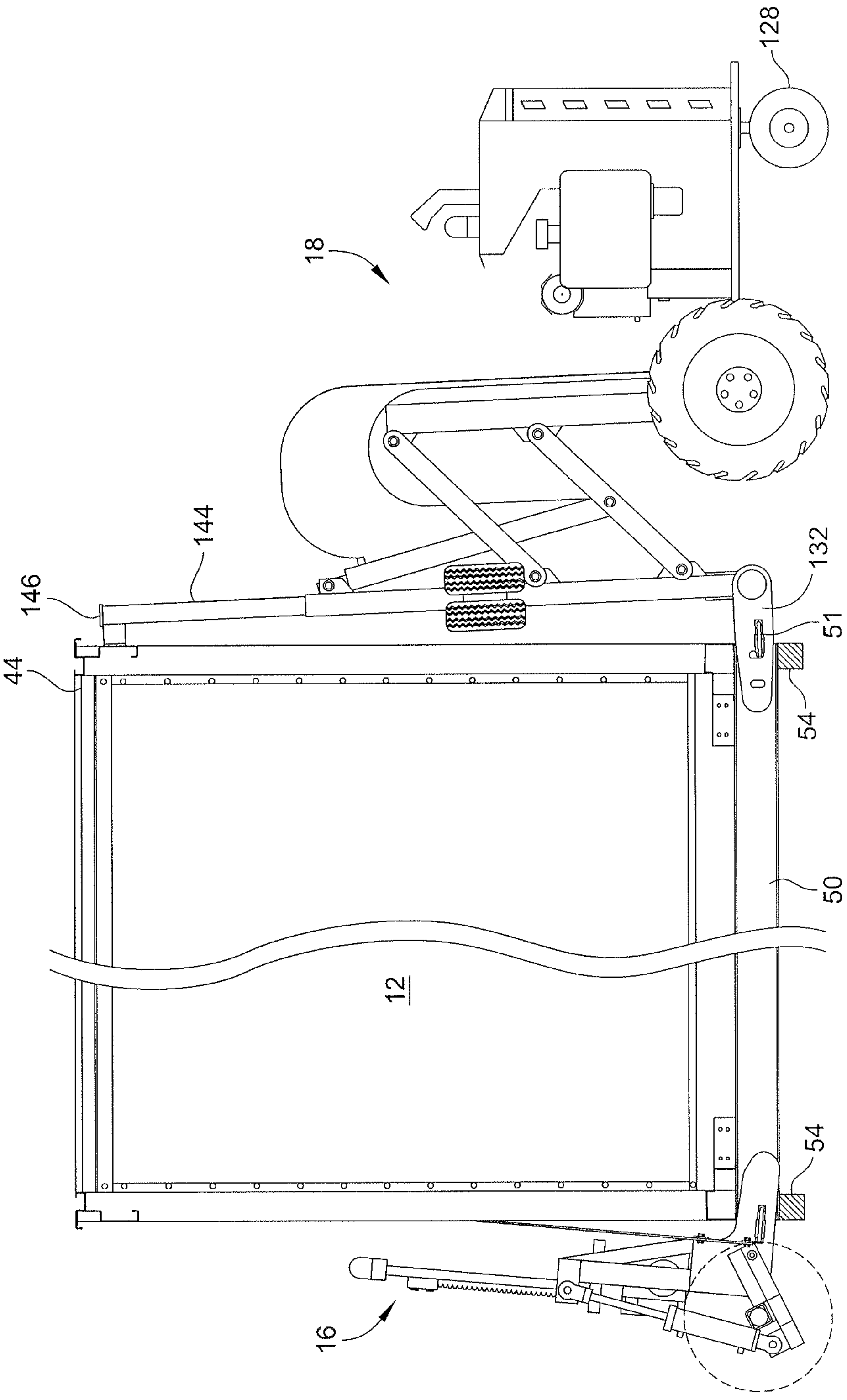

FIG. 13 is a side plan view of the system of the present invention showing the storage container unit 12 elevated from the ground 15 by the lifting wheel assembly 16 and the power hand truck 18 and outrigger assembly 124.

Figure 14:
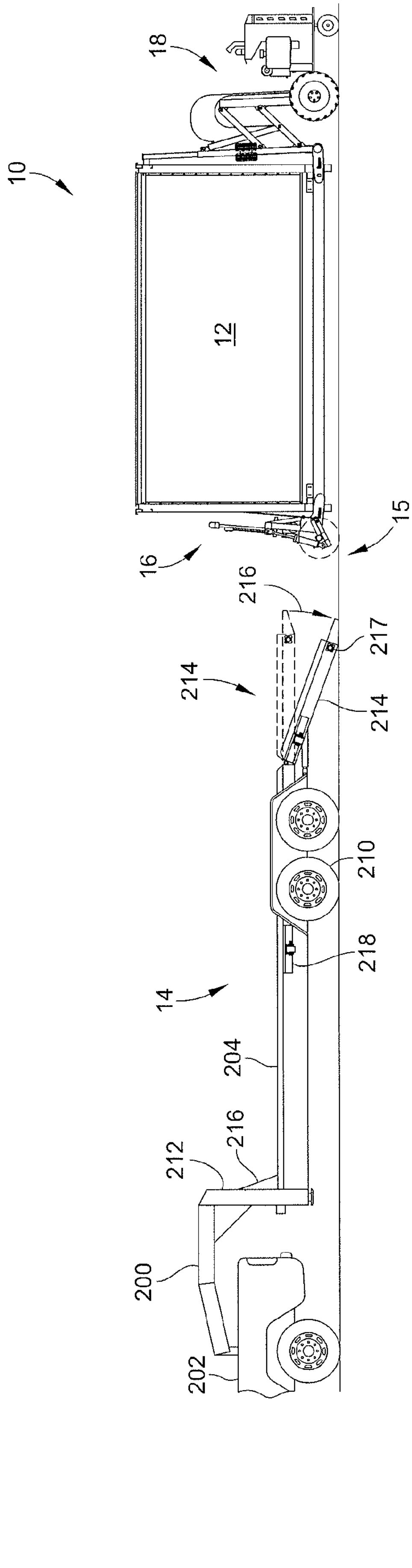

FIG. 14 is a side plan view illustrating the system 10 of the present invention in conjunction with flatbed trailer 14 with the dovetail ramp 214 in lowered position and a tow vehicle 202.

Figure 15:
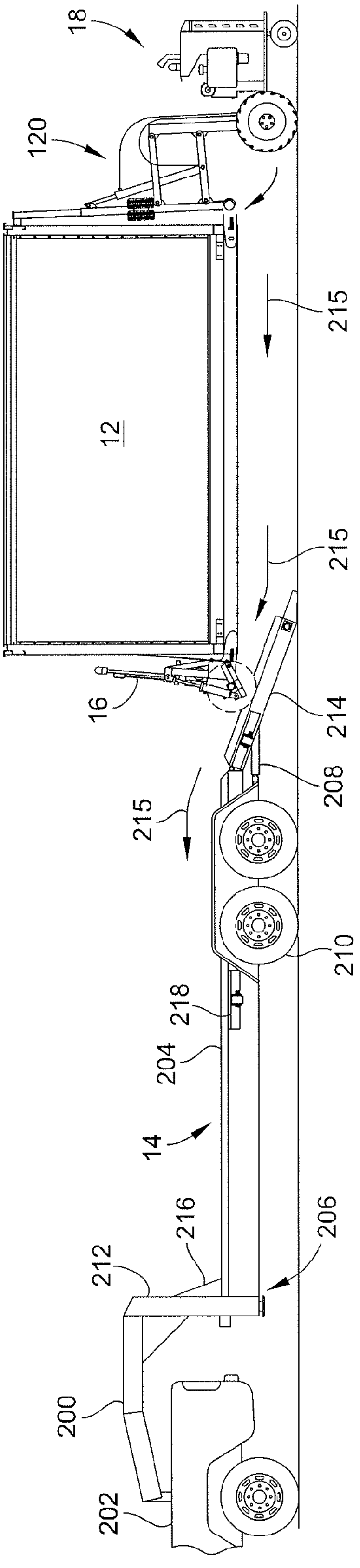

FIG. 15 is a side plan view illustrating the loading of the storage container unit 12 on the flatbed trailer 14.

Figure 16:
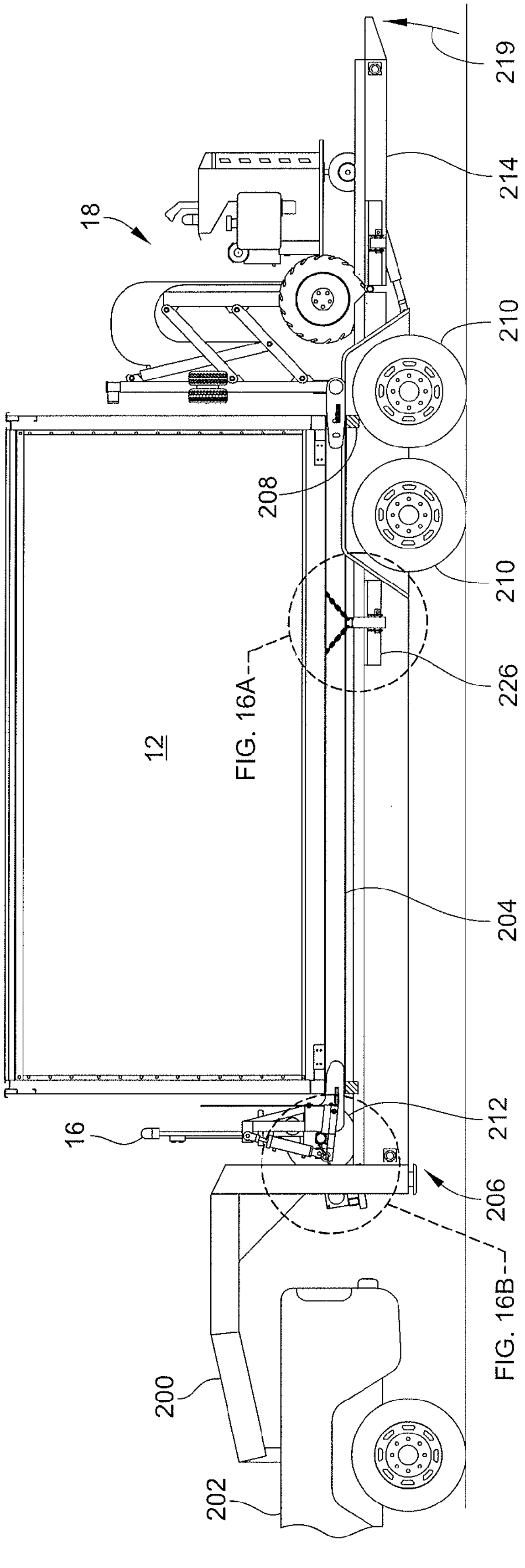

FIG. 16 is a side plan view illustrating the storage unit system 10 in place on the flatbed trailer 14 with the dovetail ramp 214 in upright loaded position.

Figure 16A:
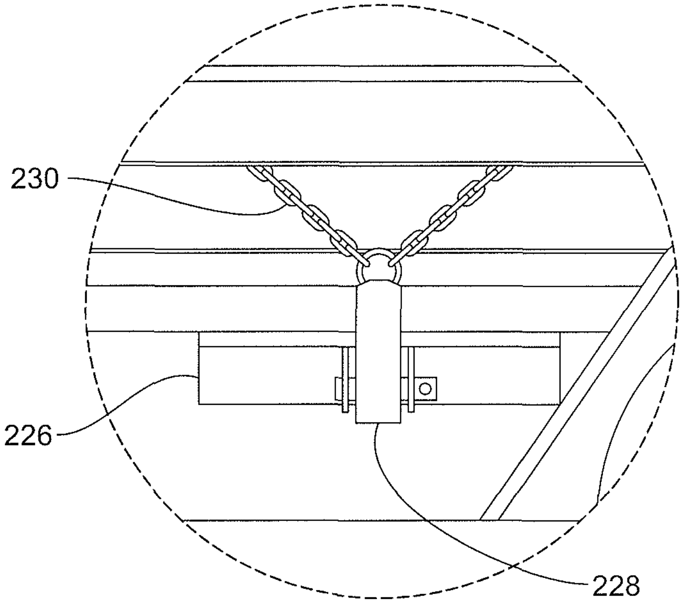

FIG. 16A is a partial view of a portion of FIG. 16 designated by the letter "A" which illustrates the sliding track 226, the sliding winch 228 and a web strap with a chain hook end 224.

Figure 16B:
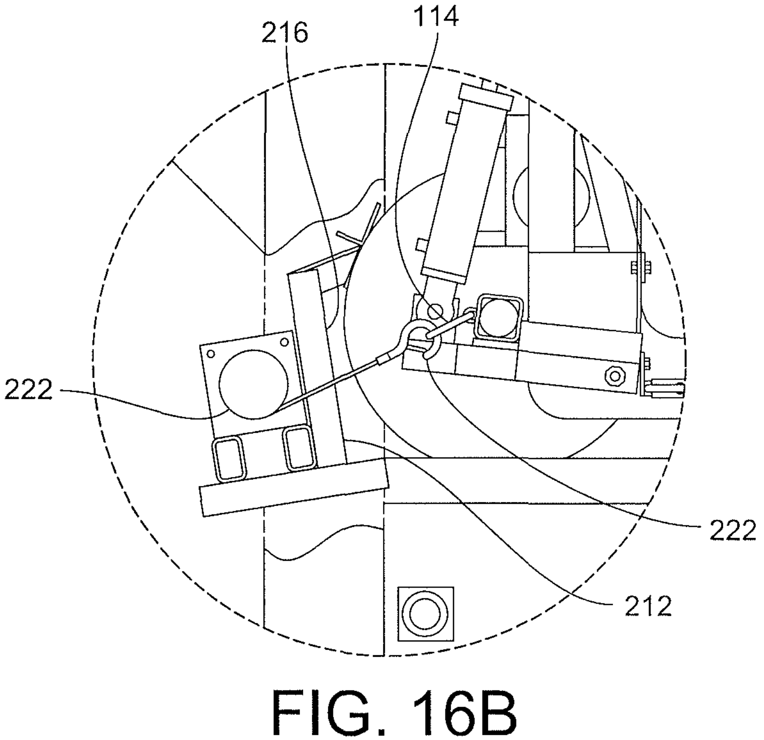

FIG. 16B is a partial view of a portion of FIG. 16 designated by the letter "B" which illustrates the winch securing system 222 for holding the lifting wheel assembly 16 to the flatbed trailer 14.

DETAILED DESCRIPTION OF THE INVENTION

Figure 1:
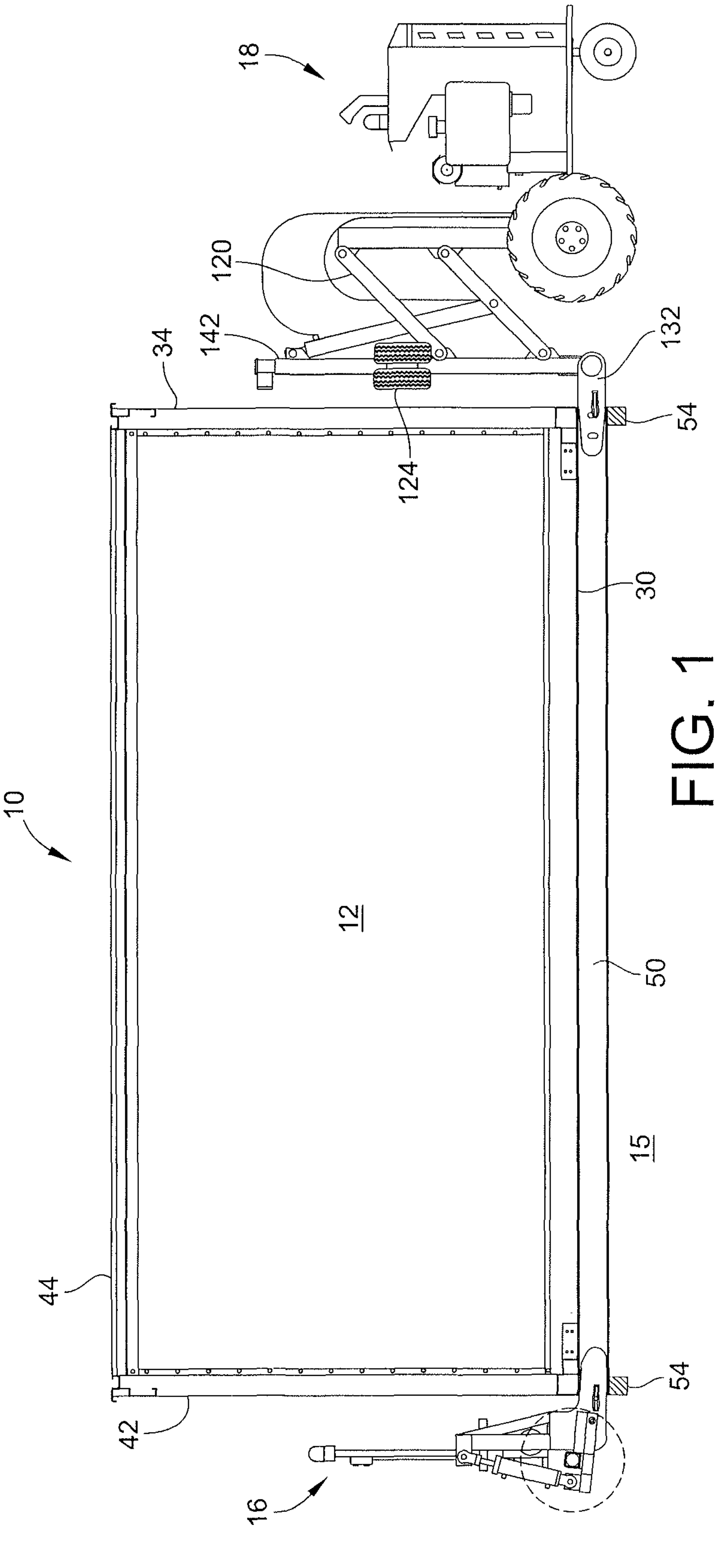

Reference is now made to the figures for a description of the wheel assembly of the present invention. FIG. 1 illustrates system 10 of the present invention for transporting a portable storage container unit 12 to another location within a facility or to a flat-bed trailer 14 as illustrated in FIG. 20. The system 10 includes the portable storage container unit 12 removably connected to a lifting wheel assembly 16 on one end of the storage container unit 12 and a power hand truck 18 on the other end of the storage container unit 12. As illustrated, the portable container unit 12 is resting on blocks 54 on the ground or level surface 15.

Storage Container Unit 12

Figure 2A:
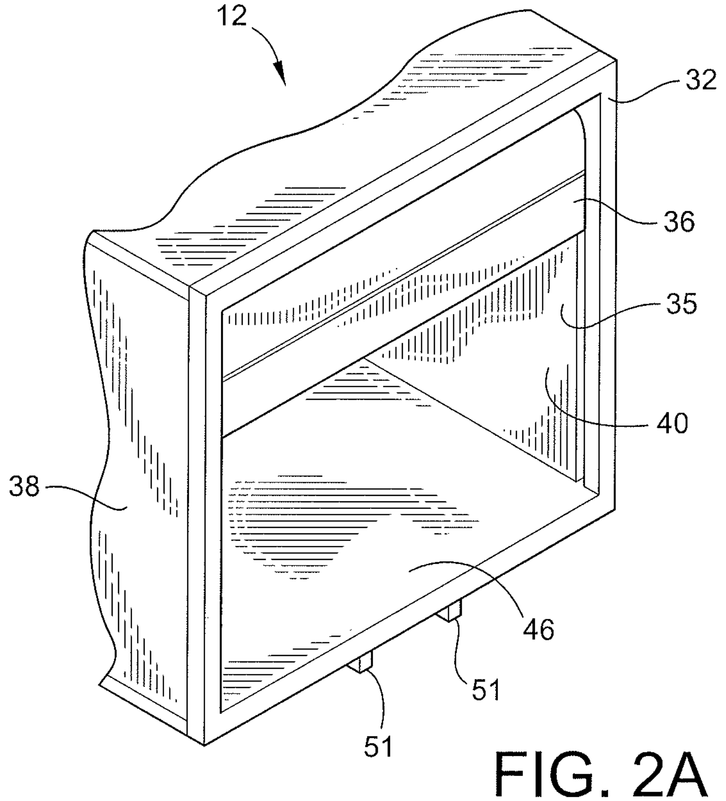
FIG. 2A is a partial perspective view of the portable storage container unit 12 of the present invention.
Figure 2B:
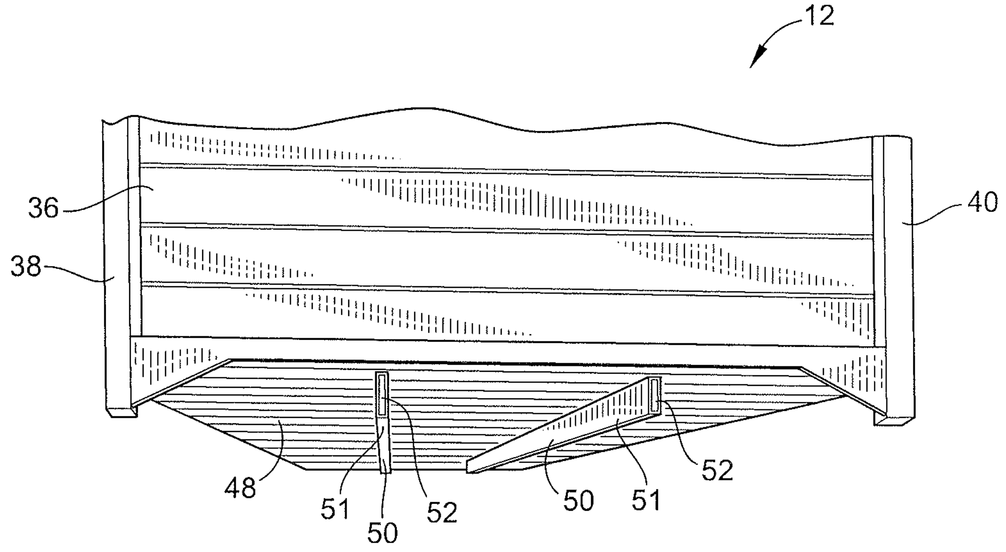
FIG. 2B is a partial perspective view of the underside 48 of the portable storage container unit 12 of the present invention.

Referring to FIGS. 1, 2A and 2B, the storage container 12 includes a substantially rectangular base 30 and frame 32 constructed with a rear wall 34 typically having an opening 35 and a slidable door 36, opposing side walls 38 and 40, a front wall 42, a roof 44 and a floor 46 having an underside 48. While the rear wall 34 is depicted with the opening 35 and slidable door 36, it is within the scope of the invention to provide one or more openings and closures or doors on any surface of the storage container unit 12. Storage container units 12 are typically known to the container storage industry. Reference is made to U.S. Pat. No. 7,704,032 in the names of Mark Rash and Lisa K. Taylor, entitled "Transportable Storage Facility," the entirety of which is incorporated herein by reference, for an example of a self-contained mobile storage container unit used by the present invention. The storage container unit 12 is typically sized to accommodate the needs of the operator or customer. Preferably, the height of the storage container unit 12 can range from about six feet to about nine feet with about seven feet, seven inches being preferred. The width of the storage container unit 12 can preferably ranges from about eight feet to about eight feet six inches, with about eight feet being most preferred. The length of the storage container unit 12 is again dependent on the needs of the customer. Preferably, a variety of lengths of container can be used, ranging from about eight or less feet to about twenty four or more feet. Storage container units 12 parting from these preferred dimensions are explicitly within the scope of the claimed invention.

Attached to the underside 48 of the floor 46 are two slides or longsills 50, wherein the longsills 50 are substantially parallel to each other, and wherein the longsills 50 extend lengthwise in a direction from the front wall 42 to the rear wall 34. Although the dimensions of the longsills 50 can be adjusted depending on the needs of the operator or the system, the longsills 50 are preferably fabricated from 2 inch×6 inch rectangular-shaped steel tubes. While the longsills 50 of the present invention are shown extending in parallel formation from the rear wall 34 to the front wall 42, it is within the scope of the present invention to provide the storage container unit 12 with segments of longsills 50 located at the rear 34 and front 42 walls of the unit 12. Each of the ends 51 of the longsills 50 are provided with pass-through openings 52, the purpose of which will be described shortly.

Lifting Wheel Assembly 16

Reference is now made especially to FIGS. 3-7 for illustrations directed to the lifting wheel assembly 16 of the present invention. The lifting wheel assembly 16 includes a pull/tilt operator's handle 60, which comprises parallel supports 62, 64 and a cross bar 66. The handle 60 is connected to a rectangular shaped base unit 68 which serves as the body of the lifting wheel assembly 16. Included on the handle 60 is a switch 70 for activating the raising and lowering mechanism of the lifting wheel assembly 16, and a warning or caution beacon 72 with an activation switch 74.

The base unit 68 includes an axle 76 and tire wheel assembly 78 and two parallel-disposed lift fork assemblies 80 having lift fork tynes 82. As illustrated best in FIGS. 3 and 5, a twist latch assembly 84 is also attached to each of the lift fork assemblies 80 for securing the lift fork assemblies 80 to the longsills 50 on the storage container units 12. The twist latch assemblies 84 comprise release and locking pins 85 which are spring loaded and designed to lock the lift fork tynes 82 to the longsills 50, which will be described later.

Figure 4:
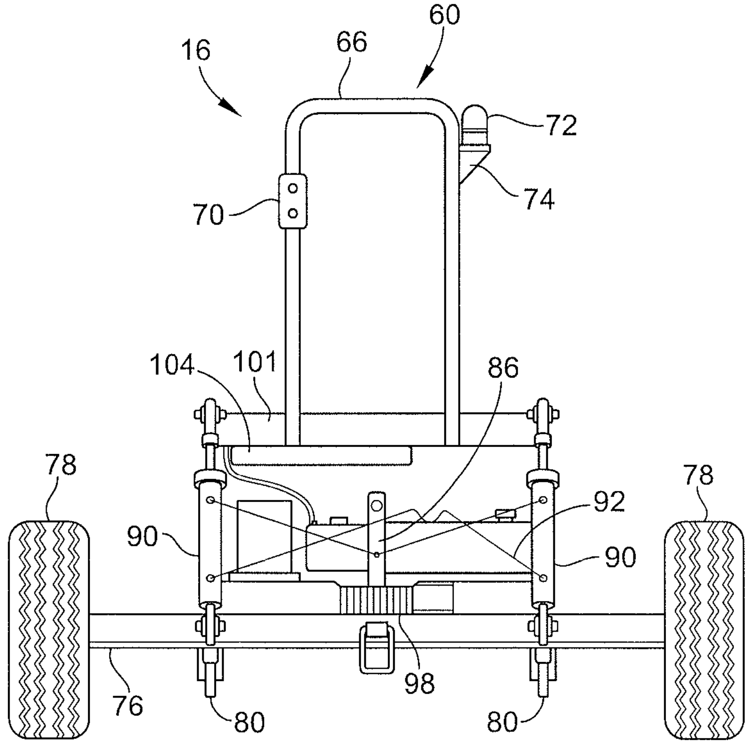
FIG. 4 is a rear plan view of the hydraulic lifting wheel assembly 16 of FIG. 3.

As illustrated in FIGS. 3 and 4, there are a high pressure port and hose assembly 86 and a low pressure port and hose assembly 88 attached to the base unit 68. These port assemblies 86, 88 are known to the art and are part of a hydraulic pump system that pumps fluid into hydraulic lift cylinders 90 creating the lifting and lowering action in the lift fork assembly 80. The high pressure port and hose assembly 86 pumps fluid from and into the hydraulic lift cylinders 90 creating the lifting action. The low pressure port and hose assembly 88 is the opposite, withdrawing the fluid back into the pump system which pulls fluid from the hydraulic lift cylinders 90 creating the lowering of the lift fork assembly 80. The hose assemblies 86 and 88 are a group of hoses that connect the hydraulic pump system with the hydraulic lift cylinders 90 together allowing hydraulic fluid to be passed between the two which creates the raising and lowering action. To raise the lift fork assembly 80, fluid is pumped into the hydraulic lift cylinders 90 causing the hydraulic lift cylinders 90 to extend, raising the lift fork assembly 80. To lower the lift fork assembly 80, fluid is released out of the hydraulic lift cylinders 90 retracting them which lowers the lift fork assembly 80.

The lifting wheel assembly 16 of the present invention can be produced with or without motor powered mobility. While a hydraulic pump motor is described here, it is within the scope of the present invention to utilize a variety of pumps, motors and/or cylinder configurations and styles. By pressing the raise/lower switch 70, an electric motor and the pump assembly in the pump motor/hydraulic fluid reservoir assembly, designated at 92, are activated which extends the lift cylinders 90. This action applies pressure on the rear of the axle assembly 76 which simultaneously lifts the lift fork assembly 80 at the pivot points 94, as illustrated in FIGS. 6 and 7. These actions are reversed by pressing the "down button" at the switch 70. The warning beacon 72 is designed to warn oncoming traffic to the presence of a potential road hazard.

As illustrated in FIG. 3, the pump motor/reservoir assembly 92 is connected to the base 68 as is a battery 96, preferably a 12 volt battery. A winch 98 is connected to the lower bracket 100 of the base unit 68. The winch 98 is typically used when the portable storage container unit 12 is resting on an uphill grade. Instead of having to push the lifting wheel assembly 16 uphill to the portable storage container unit 12 and then maneuver the lift fork tynes 82 into the longsills 50 on the portable storage container unit 12, the winch 98 can be hooked to cross members, i.e., I-beams or other suitable attachment mechanisms (not illustrated) located on the underside 48 of the storage container unit 12 and mechanically urged to the portable storage container unit 12 and in the longsills 50 without strain.

As illustrated in FIGS. 6 and 7, axle-fork pivot bolts 95 are connected to the lift fork assembly 80. The axle-fork arm 102 is the arm that attaches the axle 76 to the lift fork assembly 80. The axle-fork pivot bolts 95 attach the axle 76 to the lift fork assembly 80. The opposite end of the axle-fork arm 102 has the axle 76 attached. This same end of the axle fork arm 102 has one end of the hydraulic lift cylinders 90 attached. When the hydraulic lift cylinders 90 are extended, this pushes down on that end of the axle fork arm 102 which pushes down on the axle 76 causing the raising of the lift fork assembly 80 which raises the portable storage container unit 12 when attached. The opposite end of the axle fork arm 102 includes the axle-fork pivot bolts 95, which attaches the axle fork arm 102 to the lift fork assembly 80 and allows the lift fork arm 95 to pivot with the raising and lowering of the lifting fork assembly 80 which is caused by the extension and retraction of the hydraulic lift cylinders 90 which are attached to the opposite end of the axle fork arms 102.

Figure 5:
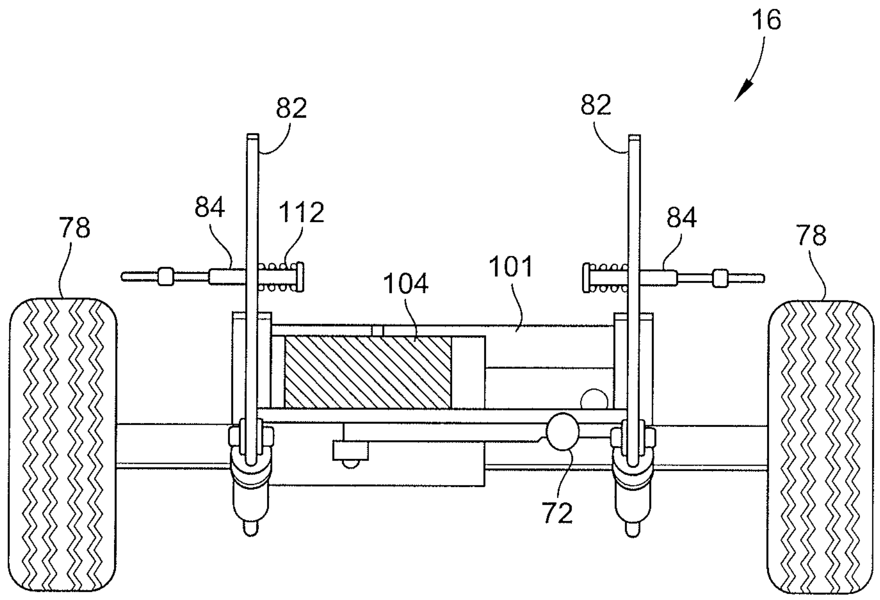
FIG. 5 is a top plan view of the hydraulic lifting wheel assembly 16 of FIG. 3.

A trickle charge solar collector 104, illustrated in FIG. 5, is preferably included and connected to the upper bracket 101 of the base unit 68. The trickle charge solar collector 104 is typically a solar battery charger. Since the lifting wheel assembly 12 is generally hydraulic and run by an electric hydraulic pump motor 92 which pumps fluid into and out of hydraulic lift cylinders 90 which creates the lifting and lowering of the lift fork assembly 80, there has to be source of electricity. The 12-volt battery 96 supplies that power source. The solar collector 104 keeps the battery 96 charged so there is no need to recharge the battery 96. Whenever the lifting wheel assembly 12 is located outside, the solar action on the solar collector 104 charges the battery 96. This type of solar collector is well known to the industry and can be purchased from many retailers across the country. An example of a trickle charge solar collector 104 is provided by Northern Tool & Equipment (Burnsville, Minn.).

Alternative Embodiment for Lifting Wheel Assembly 16

FIGS. 8-9 illustrate an alternative embodiment of the lifting wheel assembly 16 illustrating a pair of upright extended latch handles 110 connected to the twist latch assembly 84 and the release and locking pins 85. The purpose of the handles 110 is to keep the operator from having to kneel down and pull the pins 85 to lock or unlock the lift for tynes 82 to the longsills 50 on the underside 48 of the storage container unit 12. The addition of the handles 110 provides a safer working environment by allowing the operator to engage or disengage the remote twist latch assemblies 84 while in a standing position. In operation, the handles 110 are simultaneously pulled inward toward the base unit 68 following the arc of arrows 111, which causes a pivoting outward action of the release and locking pins 85. The lifting wheel assembly 16 is then maneuvered such that the lift fork tynes 82 enter the ends of the longsills 50, as illustrated in FIG. 12.

A stopper device 83 allows the lift fork tynes 92 to enter the longsills a precise distance such that the lift fork tynes 92 stop at a precise location such that the release and locking pins 85 are positioned for traversing the pass-through openings 52 at the ends 51 of the longsills 50. The action is reversed when the handles 110 are pushed in the opposite and outward direction following the arc of arrows 113. This action is aided by a compression spring 112 located on each twist latch assembly 84. The compression spring 112 secures the locking pins 85 and holds them in the locked position within the longsills 50.

The purpose of the lifting wheel assembly 16 is to create a device which can be used in the portable storage industry to aid in the movement of portable storage container units 12. The lifting wheel assembly 16 easily attaches to the portable storage container units 12 by attaching to the longsills 50 attached to the underside 48 of the storage container units 12. Once the lifting wheel assembly 16 is attached to the storage container unit 12, the lifting wheel assembly 16 can be activated to raise the portable storage container unit 12 off the ground 15 approximately 6-10 inches thereby allowing the portable storage container unit 12 to be moved easily by rolling the lifting wheel assembly 16.

Mobile Powered Hand Truck 18

Reference is now made to FIGS. 1 and 11-12 for the mobile powered hand truck 18 (also referred to as a “mule”) comprising a modified lifting arm assembly 120 that includes a specialized lift fork assembly 122 and a unique outrigger assembly 124. The basic design of the power hand truck 18 is known to the art. Reference is made to U.S. Pat. Nos. 7,597,522; 7,704,035; and 8,186,931 all to Borntrager et al., which are incorporated herein by reference for the description of the hand truck 18. A representative example of a hand truck 18 used for the present invention is produced by Cardinal Manufacturing LLC. (Carrier Mills, Ill.). The hand truck 18 typically includes a chassis 126 with powered motor, e.g., a gasoline or electronically powered motor, that drives hydraulic pumps (not illustrated) that serve several functions from driving the power wheels 128 to work the hydraulic cylinders that raise, lower and tilt several components on the equipment.

Reference is made to FIG. 11, which illustrates the hand truck 18 with the outrigger assembly 124 attached to the lifting arm assembly 120. The front view of the outrigger assembly 124 is illustrated in FIG. 12. The lifting arm assembly 120 of the hand truck 18 has been modified as follows. The lift fork assembly 122, illustrated in FIGS. 11 and 12, has been added to the lower end 130 of the lifting arm assembly 120. The lift fork assembly 122 is preferably constructed out of a strong material, such as one-inch steel, to insure it is strong enough to lift the weight of the storage container units 12, both empty and loaded.

The lift fork assembly 122 is preferably specific to the present application. However, it is within the scope of the present invention to change to size of the lift fork assembly 122 or modify it as needed to fit other storage systems in the current market. The lift fork tynes 132 of the lift fork assembly 122 are preferably tapered, as illustrated in FIG. 11, to allow for easy entrance into the ends 51 of the longsills 50 located on the underside 48 of the storage container units 12 as illustrated in FIGS. 1 and 12.

The lift fork assembly 122 is also preferably provided with small diameter openings 134 in the lift fork tynes 132 near the ends. When the lift fork tynes 134 are inserted into the ends 51 of the longsills 50, the openings 134 align with the openings 52 provided in the longsills 50. When the lift arm assembly 120 is then inserted into the longsill 50 by the power truck 18, the lift fork tynes 132 slide into the longsill to a built-in stop mechanism 135, such that the openings 134 in the lift fork tynes 132 aligned themselves with the openings 52 in the longsills 50.

The lift fork assembly 122 further includes a latch mechanism 136, which is preferably substantially identical to the latch mechanism 84 of the lifting wheel assembly 16. Once the lift fork tynes 132 have been inserted into the longsills 50 to the stop mechanism 135 thereby aligning the openings 134 in the forks tynes 132 and the openings 52 in the longsills 50, the twist latch assembly 136 can be activated by a simple twist and release of the spring-activated locking pin 138 by twisting the handle 140, allowing the locking pins 138 to pass through the openings 134 and 52, thus locking the hand truck 18 to the storage container unit 12.

While not illustrated in FIG. 11 or FIG. 12, it is within the scope of the present invention to include the upright extended latch handles 110 described with respect to the alternative embodiment for the lifting wheel assembly 16 in FIGS. 8-9, to the lift fork assembly 122 of the power truck 18. The latch handles 110 can be attached to the lift fork assembly 122 in the same manner as they are attached to the lifting wheel assembly 16. The addition of the handles 110 provides a safer working environment by allowing the operator to engage or disengage the remote locking pins 138 while in a standing position. In operation, the handles 110 are simultaneously pulled inward toward the lift fork assembly 122, which causes a pivoting outward action and release of the locking pins 138.

Centrally located on the lift fork assembly 122 is a vertically-displaced support mast 142 which includes an internally positioned extension post 144. As illustrated in FIG. 13, the extension post 144 is designed to slidably elevate such that the distal end 146 of the extension post 144 rises to a position near or at the roof 44 of the storage container unit 12, as illustrated in FIG. 13. The distal end 146 of the extension post 144 preferably includes a horizontal support 150 to releasably secure the extension post 144 to the storage container unit 12 at the location of the roof 44. When positioned in this manner, the extension post 144 secures the hand truck 18 to the rear wall 34 of the storage container unit 12 thereby assisting in the prevention possible tilting of the storage container unit 12 when the storage container unit 12 is in the elevated position as illustrated in FIG. 17. In operation, the hand truck operator (not illustrated) activates a switch on the hand truck 18 causing the extension post 144 to rise from the support mast 142 to the desired height. By further operator action, the lift fork assembly 122 activates to angle the distal end 146 of the extension post 144 such the horizontal support 150 attached to the distal end 146 will come into contact with the upper portion of the rear wall 34 or the frame 32 of the storage container unit 12. Because the lift fork tynes 132 have been “locked” to the longsills 50 located on the underside 48 of the storage container unit 12, the hand truck 18 now provides a triangular support to the rear wall 34 of the storage container unit 12, thereby assisting in the prevention of possible tipping of the storage container unit 12. Further activation of the switch by the operator causes the lift arm assembly 124 to extend and raise the fork tynes 132 thereby lifting one end of the storage container unit 12. While the hydraulic lift wheel assembly 16 will cause of end of the storage container 12 to elevate from about 6 to 10 inches off the ground 15, the lift fork assembly 124 of the power hand truck 18 to raise the other end of storage container unit 12 to a height of 48 to 50 inches or more. The advantage of this will be explained with respect to FIG. 15.

Reference is now made to FIGS. 11 and 12 for a description of the outrigger assembly 124 portion of the lift arm assembly 120. The outrigger assembly 124 is designed to give added stability to the power hand truck 18 and to the storage container unit 12 when the storage container unit 12 is attached to the power truck 18 and traveling across uneven ground 15 or surfaces where the storage container unit 12 might have the tendency to tip or tilt to one side because of the terrain.

The outrigger assembly 124 is attached to the main horizontal support bar 152 which also supports the support mast 142. The central component of the outrigger assembly 124 is comprised of a pair of extension arms 154, 156. While other materials can be used to make up the arms, the arms 154, 156 are preferably formed of heavy-gage tubular steel. The length of the arms 154, 156 depends on the particular needs and the terrain. However, each can extend from approximately 20 inches to 60 inches or more from the upright column of the lifting arm mechanism. A preferred length is about 40 inches.

As illustrated in FIGS. 11 and 12, the two arms 154, 156 are located on either side of the support mast 142. The arms 154, 156 are hingedly attached at their proximal ends 158, 160 to the support mast 142 by means known to the art, such as a heavy gage bolt 162 that traverses the arms 154, 156 and the support mast 142.

The outrigger assembly 142 includes a lift handle located on the distal ends 164, 166 of the arms 154, 156 to raise and lower the assembly 142. The outrigger assembly 142 also includes wheel assemblies 168, 170, comprising one or more wheels, located at the distal ends 164, 166 of the arms 154, 156. The wheel assemblies 168, 170 include a swivel attachment 172, 174 to allow the wheel assemblies 168, 170 to rotate as needed when the wheel assemblies 168, 170 are placed in contact with the ground surface 15 as illustrated in FIGS. 11 and 12. In this manner, the wheel assemblies 168, 170 will align themselves with the direction that the power truck 18 is going.

When not in use, the outrigger assembly 124 can be rotated to an upright position, illustrated by arrows 125 on the lift fork assembly 122, as illustrated in phantom lines in FIG. 12. The support mast 142 includes a pair of U-shaped saddles 176, 178 to seat the arms 154, 156 when the arms placed in stored position. Once the arms 154, 156 are seated in the saddles 176, 178, the arms 154, 156 may be secured by a retainer pin (not illustrated) traversing openings aligned on the saddles 176, 178 and the support mast 142.

When the outrigger assembly 124 is in its lowered position for balance, the arms 154, 156 pivot and rest in outrigger saddles 180, 182 located on the main horizontal support bar 152. When the arms 154, 156 of the outrigger assembly 124 are in their fully lowered positions resting in the outrigger saddles 180, 182, they are secured to the saddles 180, 182 in similar manner as described previously by a retainer pin.

When the outrigger assembly 124 is placed in the lowered and locked position, the outrigger assembly 124 provides a wider wheel base for the power hand truck 18 thus increasing stability on uneven terrain. While the outrigger assembly 124 is described without any added mechanism for raising or lowering the outrigger wheels, it is within the scope of the present invention to provide hydraulic, electric or other means to raise and lower the outrigger arms 154, 156. In addition, the arms 154, 156 can be made with tubular extensions to increase or decrease the length of the arms 154, 156 as needed.

Flatbed Trailer 14

Reference is now made to FIGS. 14-16B which illustrate the positioning of the portable storage container unit 12 on the flatbed trailer 14. The flatbed trailer 14 is specially customized to work in conjunction with components described in this invention. The flatbed trailer 14 can be configured with any of the industries coupling systems (known to the art) ranging from a standard trailer hitch to a gooseneck hitch. The gooseneck hitch system 200 is preferred and illustrated in FIGS. 14-15 for purposes of this description. The hitch 200 connects the flatbed trailer 14 to a truck 202 for transporting the trailer 14. The trailer includes a bed 204 having a first front end 206 and a second back end 208 supported by a series of wheels 210. A backboard 212 is positioned between the bed 204 and the gooseneck hitch 200. The trailer 14 further includes a hydraulic dove-tail ramp 214 located at the back end 208 of the trailer 14. The hydraulic dove-tail ramp 214 can be lowered to the ground surface 15, as illustrated by the phantom lines and arrow 216, to allow the portable storage unit 12 with the attached hydraulic lifting wheel assembly 16 and the hand truck 18 to roll easily up the ramp 214, assisted by the power of the hand truck 18, for loading and unloading.

The ramp 214 is preferably operated by a switch located at on the rear of the flatbed trailer 214. The hydraulic system for operating the ramp 214, not illustrated, is operated by an electric hydraulic pump located in the bed 204 of the trailer 14. An electric pump (not illustrated) is powered by a 12 volt battery also located in the bed 204 of the trailer 14. A specialized load rack 216 located at the front end 206 of the trailer 14 is made to receive the tire wheel assembly 78 of the lifting wheel assembly 16. The flatbed trailer 14 also has at least one and preferably two or sliding wrench 228, illustrated in FIGS. 16A and 16B, used to secure the storage container unit 12 to the flatbed trailer during transportation. Ratchet straps are known to the industry and include sliding tracks 226 and chains 220 or canvas straps utilized for securing the portable storage container unit 12 to the bed 204 of the trailer 14.

Operation

Reference is now made to FIGS. 1, 10 and 13-16B which illustrates the operation of the assembly 10.

As illustrated in FIG. 10, the lifting wheel assembly 16 is rolled into position opposite one end of the portable storage container unit 12. The lifting wheel assembly 16 is in its lowered position as illustrated in FIGS. 1 and 10. The lift fork assembly 80 located on the lifting wheel assembly 16 is positioned directly opposite the longsills 50 located on the underside 48 of the storage container unit 12. As illustrated in FIGS. 1 and 10, a block 54, such as a wooden 4×4 block or a similar device, is placed under both longsills 50 at each end of the storage container unit 12 when lowered.

The lifting wheel assembly 16 is pushed forward allowing the lifting forks tynes 82 to slide into the ends 51 of the longsills 50 located on the underside 48 of the portable storage unit 12. The lifting forks tynes 82 slide into the longsills 50 until they come in contact with stopper 83 on the lifting forks tynes 82. The twist latch assembly 84 can be activated to withdraw the release and locking pins 85 to the point where the twist latch assembly 84 can be released allowing it to enter through the openings 52 located on the ends 51 of the longsills 50 and the openings 87 located on the lift fork tynes 82 thus securely locking the two components together. When the lifting fork tynes 82 are inserted into the longsills 50 of the portable storage container unit 12, the twist latch assemblies 84 which are spring loaded are pulled out, twisted forward so the locking pins 85 on the twist latch assemblies 84 line up with the openings 87 in the lifting fork tynes 82 and the openings 52 in the longsills 50. The twist latch assemblies 84 are then released with the pins 85 passing through the openings 52 in the longsills 50 and the openings 87 in the lifting fork tynes 82, locking the two components and therefor the lifting wheel assembly 16 and portable storage container unit 12 together.

Referring again to FIGS. 1 and 11-13, the mobile powered hand truck 18 is activated by an operator and moved toward the portable storage container unit 12 by action of the power wheel 128 such that the lift fork tynes 132 are urged within the ends 51 of the longsills 50 until the fork tynes 132 are prevented from entering the longsills further by the stopper device 135. At that point, the latch mechanism 136 is activated to allow the spring-activated locking pin 138 to pass through the openings 134 and 52, thus locking the power hand truck 18 to the storage container unit 12. By action of the operator, the extension post 144 is hydraulically elevated within the vertically-displaced support mast 142 such that the distal end 146 of the extension post 144 rises to a position near or at the roof 44 of the storage container unit 12. The horizontal support 150 attached to the distal end 146 of the extension post 144 is hydraulically urged forward to press against the rear wall 34 of the storage container unit 12 near the roof 44 thereby securing the support mast to the storage container unit 12. When positioned in this manner, the extension post 144 secures the hand truck 18 to the storage container unit 12 providing triangular support points as described previously. If required, the outrigger assembly 124 can be activated to lower the arms 154, 156 thereby lowering the wheel assemblies 168, 170 to the ground 15 to provide additional balance support. By operator control, the lifting arm assembly 120 is activated to raise the fork tynes 132 thereby elevating the rear end portion of the storage container unit 12.

Once the two components 16, 18 are securely connected by the twist latch assembly 84, the lifting wheel assembly 16 can raise the end of the portable storage container unit 12 to which it is attached from its lowered position and the power hand truck 18 can raise the rear end 34, as illustrated in FIG. 13. Once the assemblies 16, 18 are fully raised, all weight for the front end 42 of the portable storage container unit 12 is on the axle 76/tire wheel assembly 78, allowing for the portable storage container unit 12 to be moved provided another lifting wheel assembly 12, the power hand truck 18 or another power and lifting source, e.g., a forklift, is attached to the opposite end of the portable storage container unit 12. In this manner, the storage container unit 12 is fully raised off the blocks 54 and ready for transportation from one location to another, as illustrated in FIG. 13.

Referring now to FIG. 14, the system 10, which includes the storage container unit 12 elevated by means of the lifting wheel assembly 16 and the power hand truck 18 is maneuvered behind the dove-tail ramp 214 of the flatbed trailer 14. The ramp is lowered according to the direction of the arrow 216 such that the end 217 of the ramp 214 is positioned on the ground 15.

Reference is now made to FIG. 15 for a side plan view illustrating the loading of the portable storage container unit 12 onto the bed 204 of the flatbed trailer 14. With the end of the ramp 217 in position on the ground 15 as illustrated in FIG. 15, the power hand truck 18 is available to push the storage container unit 12 with the lifting wheel assembly 16 up the trailer ramp 214 to the bed 204 of the flatbed trailer 14 along the direction of arrows 215 as the storage container unit 12 is urged up the ramp 214 of flatbed trailer 14, it is important to keep the storage container 12 horizontal or level in order to avoid displacement of any internal contents within the container unit 12. Accordingly, the power hand truck 18 operator continues to activate the lifting arm assembly 120 to keep the storage container unit 12 in horizontal alignment with respect to the ground 15. This is an important feature as it prevents any unwanted shifting of contents and potential breakage within the storage container unit 12.

Reference is now made to FIG. 16 for a side plan view illustrating the storage container unit 12 in place on the bed 204 of the flatbed trailer 14. Once the storage container unit 12 is fully loaded such that the tire wheel assembly 78 of the lifting wheel assembly 16 is urged against the backboard 212 of the flatbed trailer 14, as illustrated in FIGS. 16 and 16B, the ramp 214 is elevated along the direction of arrow 219. The lifting wheel assembly 16 is then secured to the flatbed trailer 14 by a winch 222, such as an electric winch, located on the back 212 of the flatbed trailer 14. The winch includes a hook 224 which is attached to the lifting wheel assembly 16 by means of a D-ring 114 connected to the frame 32 of the lifting wheel assembly 16.

As illustrated in FIG. 16A, the flatbed trailer includes one or more sliding tracks 226 which can be moved along the underside of the bed 204 of the flatbed trailer 14. The sliding track includes a sliding winch end 228 and preferably a web strap and chain hook end 230 for attachment to securing devices (not illustrated) on the underside 48 of the storage container unit 12. In this manner, the storage container unit can be secured and tightened to the bed 204 of the flatbed trailer 14.

Once the storage container unit 12 is secured to the flatbed trailer 14 as described above, the assembly 10 is available for transport via the truck 202 and flatbed trailer 14 to a separate location.

The process is reversed to allow the unloading of the storage container unit from the flatbed trailer.

Any version of any component or method step of the invention may be used with any other component or method step of the invention. The elements described herein can be used in any combination whether explicitly described or not.

All combinations of method steps as used herein can be performed in any order, unless otherwise specified or clearly implied to the contrary by the context in which the referenced combination is made.

As used herein, the singular forms “a,” “an,” and “the” include plural referents unless the content clearly dictates otherwise.

Numerical ranges as used herein are intended to include every number and subset of numbers contained within that range, whether specifically disclosed or not. Further, these numerical ranges should be construed as providing support for a claim directed to any number or subset of numbers in that range. For example, a disclosure of from 1 to 10 should be construed as supporting a range of from 2 to 8, from 3 to 7, from 5 to 6, from 1 to 9, from 3.6 to 4.6, from 3.5 to 9.9, and so forth.

All patents, patent publications, and peer-reviewed publications (i.e., “references”) cited herein are expressly incorporated by reference in their entirety to the same extent as if each individual reference were specifically and individually indicated as being incorporated by reference. In case of conflict between the present disclosure and the incorporated references, the present disclosure controls.

The devices, methods, compounds and compositions of the present invention can comprise, consist of, or consist essentially of the essential elements and limitations described herein, as well as any additional or optional steps, ingredients, components, or limitations described herein or otherwise useful in the art.

While this invention may be embodied in many forms, what is described in detail herein is a specific preferred embodiment of the invention. The present disclosure is an exemplification of the principles of the invention is not intended to limit the invention to the particular embodiments illustrated. For example, one of more of the components described in the disclosure could easily be used in the farming industry. It is to be understood that this invention is not limited to the particular examples, process steps, and materials disclosed herein as such process steps and materials may vary somewhat. It is also understood that the terminology used herein is used for the purpose of describing particular embodiments only and is not intended to be limiting since the scope of the present invention will be limited to only the appended claims and equivalents thereof.

What is claimed is:

1. A two-wheeled lifting assembly for assisting in moving and positioning a storage container unit, wherein the storage container unit includes a first end and a second end and a floor comprising parallel disposed longsills extending from the first end to the second end of the storage container unit, wherein the longsills include open ends, the lifting wheel assembly comprising:

a. a base unit including the two-wheeled lifting assembly and further including an axle connecting the two-wheeled assembly and a hydraulic pump; and b. a lift fork assembly comprising first and second parallel-disposed lifting forks wherein each of the first and second lifting forks includes a fork tyne, wherein the lift fork assembly is pivotally attached to the axle via axle-fork arms and wherein the lift fork assembly includes first and second hydraulic cylinders attached between the hydraulic pump and the first and second parallel-disposed lifting forks such that the first hydraulic cylinder actuates the first lifting fork and the second hydraulic cylinder actuates the second lifting fork, wherein the extension of the first and second hydraulic cylinders causes the first and second lifting forks to move upwardly and outwardly to releasably engage the parallel disposed longsills at one end of the storage container unit, and the retraction of the first and second hydraulic cylinders causes the first and second lifting forks to move downwardly and inwardly.

2. The lifting wheel assembly of claim 1 further comprising a twist latch assembly on the distal end of each of the fork tynes, wherein the twist latch assembly is configured to secure each of the fork tynes to the parallel disposed longsills.

3. The lifting wheel assembly of claim 1 further comprising a battery for powering the hydraulic pump.

4. The lifting wheel assembly of claim 3 further comprising a solar power trickle charger for charging the battery.

5. The lifting wheel assembly of claim 1 further comprising a winch.

6. The lifting wheel assembly of claim 1 further comprising an operator handle.

7. The lifting wheel assembly of claim 1 further comprising a caution beacon.

8. The lifting wheel assembly of claim 2 further comprising extended latch handles connected to the twist latch assembly for remotely engaging the twist latch assembly.

9. The lifting wheel assembly of claim 2 wherein each of the fork tynes includes a stopper device for placement of the fork tyne in the longsills.

10. A system for transporting a portable storage container unit, comprising:

a. a storage container unit having a first end and a second end, the storage container unit including a floor with parallel disposed longsills, wherein the longsills include open ends;

b. at least one lifting wheel assembly for releasable attachment to an end of the storage container unit and moving the storage container unit from a ground surface, the lifting wheel assembly comprising:

i. a base unit including a two-wheeled assembly and further including an axle connecting the two-wheeled assembly and a hydraulic pump; and ii. a lift fork assembly comprising first and second parallel-disposed lifting forks wherein each of the first and second lifting forks includes a fork tyne, wherein the lift fork assembly is pivotally attached to the axle via axle-fork arms and wherein the lift fork assembly includes a first and second hydraulic cylinders attached between the hydraulic pump and the first and second parallel-disposed lifting forks such that the first hydraulic cylinder actuates the first lifting fork and the second hydraulic cylinder actuates the second lifting fork, wherein the extension of the first and second hydraulic cylinders causes the first and second lifting forks to move upwardly and outwardly to releasably engage a longsill, and the retraction of the first and second hydraulic cylinders causes the first and second lifting forks to move downwardly and inwardly; and c. a flatbed trailer having a first end and a second end for transporting the lifting wheel assembly and the storage container unit, comprising:

i. a hitch for securing the first end of the flatbed trailer to a vehicle;

ii. a bed having a first front end and a second back end supported by a series of wheels;

iii. a backboard at the first front end and positioned between the bed and the hitch;

iv. a rotating ramp at the second end of the trailer, wherein the ramp has a first proximal end rotatably attached to the second end of the trailer and a second distal end for placement at a ground surface for loading the storage container unit;

v. means to position the lifting wheel assembly and the storage container unit on the bed of the trailer; and vi. means to secure the lifting wheel assembly and the storage container unit to the trailer.

11. The system of claim 10 wherein the ramp is a hydraulic dove-tail ramp.

12. The system of claim 10 further comprising a mobile powered hand truck for moving at least one end of the storage container unit, comprising:

a. a powered chassis;

b. a lifting arm assembly for maintaining the storage container unit in horizontal alignment with respect to the ground surface, the lifting arm assembly attached to the powered chassis, the lifting arm assembly including a support bar with a center lift fork assembly wherein the support bar includes a pair of lift forks having fork tynes;

c. an outrigger assembly attached to the lifting arm assembly, the outrigger assembly comprising:

i. a central support mast having a first end and a second end, wherein the first end is connected to the support bar;

ii. a pair of stabilizing extension arms each having a first proximal end and a second distal end, wherein the first proximal ends of the extension arms are hingedly and rotatably attached to the center lift fork assembly;

iii. a lift handle to raise and lower the extension arms;

iv. means to secure the extension arms in raised position adjacent the central support mast;

v. means to secure the extension arms to the support bar in lowered position;

vi. a wheeled assembly rotatably attached to each of the second distal ends of each of the pair of extension arms.

13. A system for transporting a portable storage container unit, comprising:

a. a storage container unit having a first end and a second end and a floor comprising parallel disposed longsills extending from the first end to the second end of the storage container unit and wherein the longsills include open ends;

b. a lifting wheel assembly for moving the first end of the storage container unit from a ground surface, the lifting wheel assembly comprising:

i. a base unit including a two-wheeled assembly and further including an axle connecting the two-wheeled assembly and a hydraulic pump; and ii. a lift fork assembly comprising first and second parallel-disposed lifting forks wherein each of the first and second lifting forks includes a fork tyne, wherein the lift fork assembly is pivotally attached to the axle via axle-fork arms and wherein the lift fork assembly includes first and second hydraulic cylinders attached between the hydraulic pump and the first and second parallel-disposed lifting forks such that the first hydraulic cylinder actuates the first lifting fork and the second hydraulic cylinder actuates the second lifting fork, wherein the extension of the first and second hydraulic cylinders causes the first and second lifting forks to move upwardly and outwardly to releasably engage a longsill, and the retraction of the first and second hydraulic cylinders causes the first and second lifting forks to move downwardly and inwardly;

c. a mobile powered hand truck for moving at least one end of the storage container unit, comprising:

i. a powered chassis;

ii. a lifting arm assembly for maintaining the storage container unit in horizontal alignment with respect to the ground surface, the lifting arm assembly attached to the powered chassis, the lifting arm assembly including a support bar with a center lift fork assembly wherein the support bar includes a pair lift forks having fork tynes;

iii. an outrigger assembly attached to the lifting arm assembly, the outrigger assembly comprising:

a. a central support mast having a first end and a second end, wherein the first end is connected to the support bar;

b. a pair of stabilizing extension arms each having a first proximal end and a second distal end, wherein the first proximal ends of the extension arms are hingedly and rotatably attached to the center lift fork assembly;

c. a lift handle to raise and lower the extension arms;

d. means to secure the extension arms in raised position adjacent the central support mast; and e. means to secure the extension arms to the support bar in lowered position; and iv. a wheeled assembly rotatably attached to each of the second distal ends of each of the pair of extension arms; and c. a flatbed trailer for transporting a storage container unit, comprising:

i. a hitch for securing the trailer to a vehicle;

ii. a bed having a first front end and a second back end supported by a series of wheels;

iii. a backboard at the first front end and positioned between the bed and the hitch;

iv. a rotating ramp at the back end of the trailer, wherein the ramp has a first proximal end rotatably attached to the back end of the trailer and a second distal end for placement at a ground surface for loading the storage container unit; and v. means to position and secure the storage container unit, the lifting wheel assembly and the mobile powered hand truck to the trailer.

14. The system of claim 13 wherein the ramp is a hydraulic dove-tail ramp.

* * * * *